United States Patent
Geisow

[15] 3,695,106
[45] Oct. 3, 1972

[54] GAS TURBINE METER

[72] Inventor: Bernard H. Geisow, Houston, Tex.

[73] Assignee: Daniel Industries, Inc., Houston, Tex.

[22] Filed: July 2, 1970

[21] Appl. No.: 51,834

[52] U.S. Cl. .............................................. 73/231 R
[51] Int. Cl. ................................................ G01f 1/06
[58] Field of Search ........... 73/229, 230, 231; 277/56

[56] References Cited

UNITED STATES PATENTS

| | | | |
|---|---|---|---|
| 3,342,070 | 9/1967 | Walch, Jr. .................... | 73/231 |
| 3,465,425 | 9/1969 | Leidenfrost ................. | 277/56 |
| 3,477,385 | 11/1969 | Tangeman et al. .......... | 277/56 |
| 3,439,538 | 4/1969 | Farrell ......................... | 73/230 |
| 3,440,877 | 4/1969 | Kovats ......................... | 73/230 |
| 2,988,916 | 6/1961 | Waugh ........................ | 73/231 |

*Primary Examiner*—Richard C. Queisser
*Assistant Examiner*—Herbert Goldstein
*Attorney*—Arnold, White and Durkee, Donald C. Roylance, Stanley A. Becker and Darryl M. Springs

[57] ABSTRACT

In one exemplar embodiment, a gas turbine flow meter is provided having a magnetic induction signal producing means disposed within the gas flow path of the meter and having unique weir type seals for protecting the rotor bearings from contamination, thus substantially prolonging the life of the rotor bearings. The magnetic induction coil and magnets utilized in the signal producing means are radially spaced significantly closer to the rotor axis of rotation than the rotor blades for substantially increasing the mechanical advantage of the meter and improving its low pressure, low flow-rate signal producing capability.

9 Claims, 7 Drawing Figures

Bernard H. Geisow
INVENTOR

BY
Arnold, White & Durkee
ATTORNEYS

Bernard H. Geisow
INVENTOR

BY
Arnold, White & Durkee
ATTORNEYS

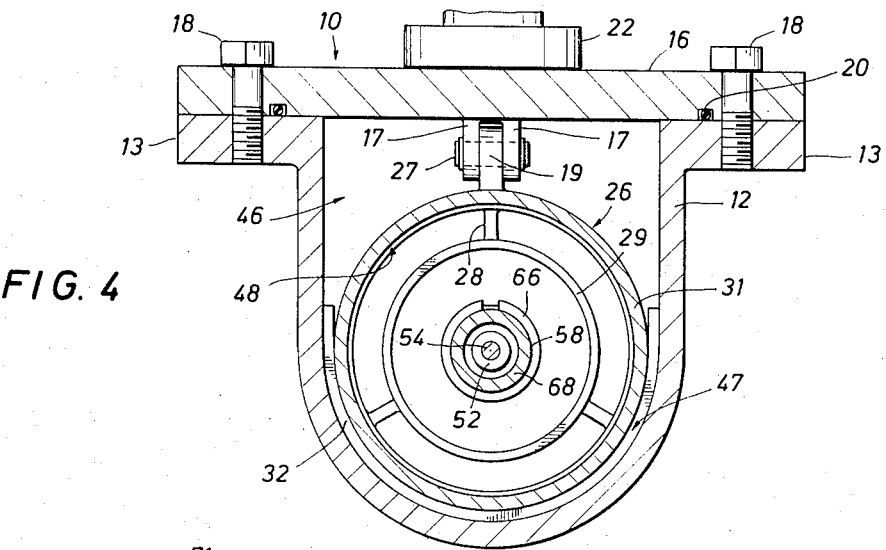
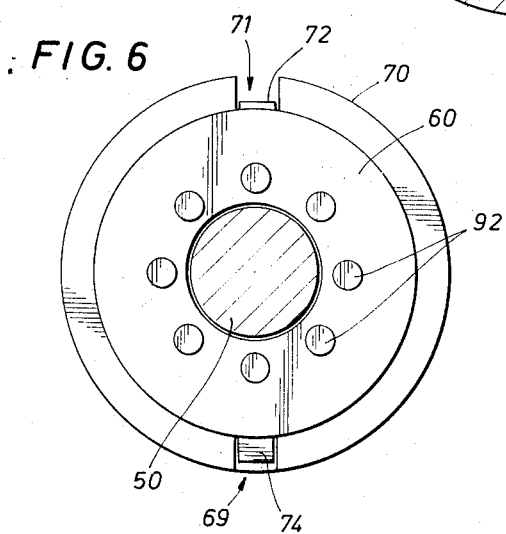
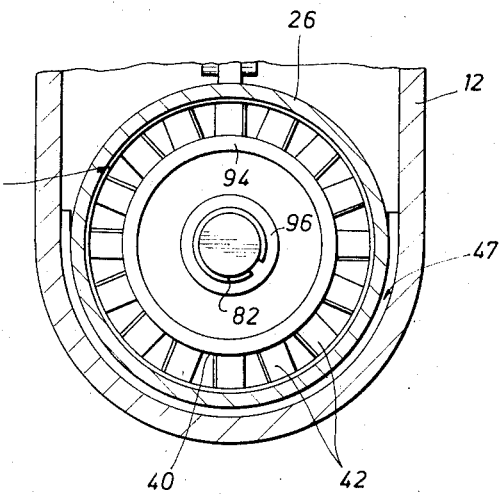
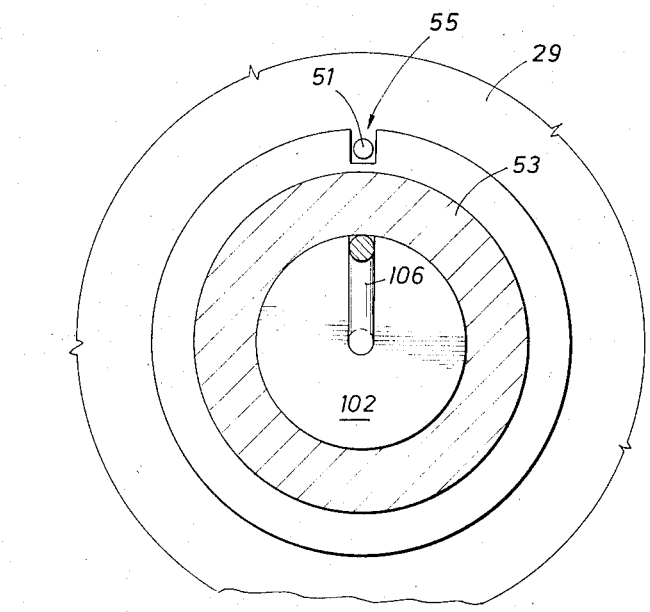
Bernard H. Geisow
INVENTOR

GAS TURBINE METER

BACKGROUND OF THE INVENTION

This invention relates to fluid-flow meters and more particularly to an improved gas turbine meter apparatus for producing an electrical signal representative of gas flow rate.

In many fluid flow measuring applications, particularly when measuring the flow of gas, it has been the practice to employ positive displacement meters utilizing a gear driven shaft for driving a mechanical register. Gear driven registers prove to be inaccurate over a given period of time due to the wear and subsequent "looseness" of the gear train. Turbine or axial-flow meters utilized in gas measuring applications have generally utilized a magnetic coupling drive for actuating a mechanical drive, or have utilized magnetic pickup coils mounted in the meter housing radially spaced from and aligned with the rotor blades to generate a predetermined number of discrete pulses in each revolution of the rotor. The electrical pulses may be counted by means of electronic or electro-mechanical counters and by means of conventional flow computers can be converted into flow rate and volume.

However, the mechanical advantage of turbine meters utilizing such detection coils mounted in the housing is low, particularly in low pressure, low flow-rate applications, because the torque due to magnetic attraction between the blades of the rotor and the magnet utilized in connection with the coil is significant in relation to the driving torque developed by the fluid acting against the rotor blades.

Another problem experienced with present turbine flow meters is their short rotor bearing life due to gas rouge, dirt and other particles in the gas that infiltrate the rotor bearings and ultimately destroy them.

SUMMARY OF THE INVENTION

The present invention remedies the problems of the prior art by providing a turbine fluid-flow meter, especially suited for measuring gas, that utilizes magnets radially disposed in a member that rotates with the rotor and induces a magnetic flux in a fixed core spaced from and aligned with the rotating magnets. The magnetic flux induced in the core in turn induces a signal in a coil wound about the core member and is transmitted to appropriate registering equipment. The radial displacement of the magnets from the rotational axis of the rotor is small compared with the average radius through which the fluid acts on the blades, thus enhancing the mechanical advantage of the meter and providing extremely linear low flow-rate and low pressure performance. In addition, the meter utilizes unique weir type seals to protect the rotor bearings and thus significantly extend the life of the meters without the necessity of replacing the rotor bearings.

Accordingly, one primary feature of the present invention is to provide an axial gas flow meter that does not utilize a gear drive to actuate a mechanical register displaying flow rate or volume.

Another feature of the present invention is to provide an axial-flow meter having extremely linear low pressure, low flow-rate signal characteristics.

Still another feature of the present invention is to provide a novel weir type seal to prevent contamination of the meter rotor bearings and significantly prolong rotor bearing life.

Yet another feature of the present invention is to provide a rotor assembly housing a signal producing means disposed in the fluid flow.

Another feature of the present invention is to provide a signal producing means disposed in the fluid flow of a turbine meter utilizing an induction coil and a rotating array of magnets radially spaced from the rotor axis, the radial spacing of the magnets and induction coil being significantly less than the radius of the rotor blades for increasing the mechanical advantage of the meter.

BRIEF DESCRIPTION OF THE DRAWINGS

In order that the manner in which the above-recited advantages and features of the invention are attained, as well as others which will become apparent, can be understood in detail, a more particular description of the invention may be had by reference to specific embodiments thereof which are illustrated in the appended drawings, which drawings form a part of the specification. It is to be noted, however, that the appended drawings illustrate only typical embodiments of the invention and therefore are not to be considered limiting of its scope for the invention may admit to further equally effective embodiments.

In the drawings:

FIG. 4 is a detailed vertical cross-sectional view of the fluid turbine meter taken along lines 4—4 of FIG. 1.

FIG. 5 is a detailed vertical cross-sectional view of the fluid turbine meter taken along lines 5—5 of FIG. 1.

FIG. 6 is a detailed vertical cross-sectional view of the spindle assembly looking into the magnet retainer member as taken along lines 6—6 of FIG. 3.

FIG. 7 is a detailed vertical cross-sectional view of the flanged spindle head exposing the induction pickup core as taken along lines 7—7 of FIG. 3.

DETAILED DESCRIPTION OF THE PREFERRED EMBODIMENTS

Figures 1, 2:
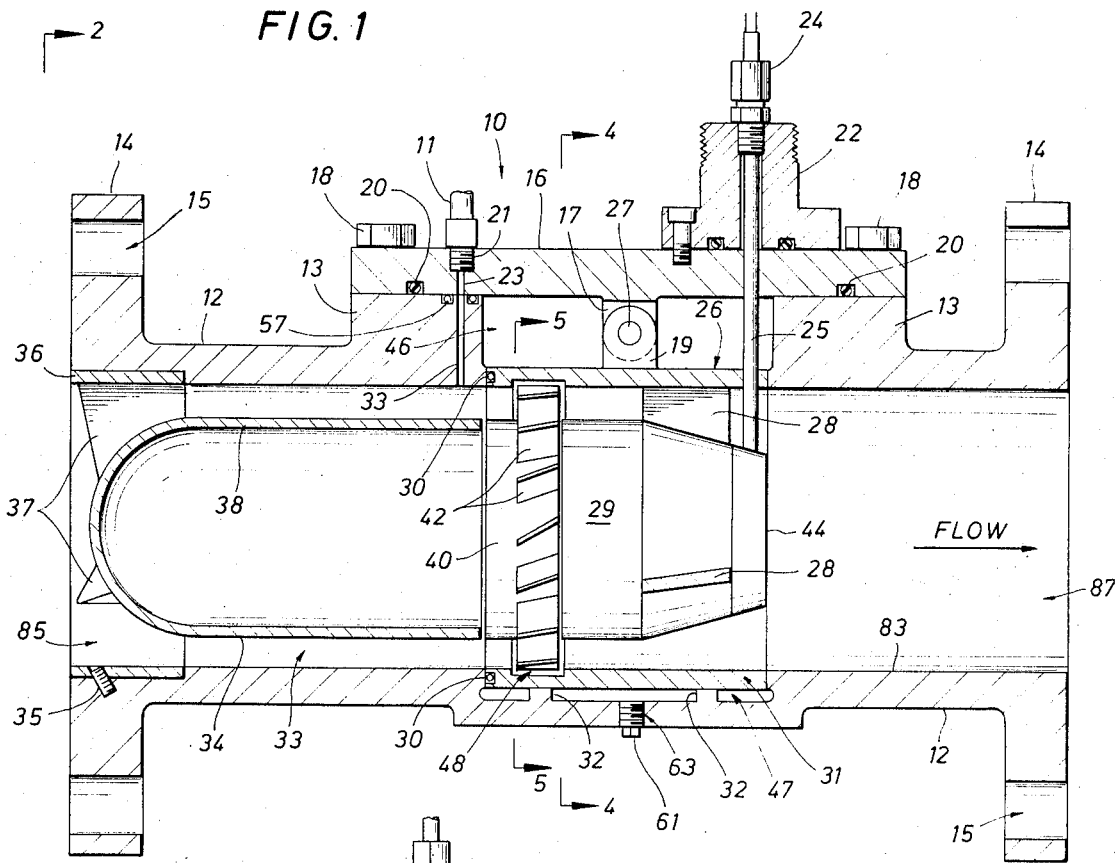
FIG. 1 is a longitudinal cross-section of a fluid turbine meter constructed according to a preferred embodiment of the invention.
FIG. 2 is an upstream end view of the fluid turbine meter shown in FIG. 1.

Referring now to FIGS. 1, 2 and 4, the gas turbine meter 10 comprises a cast or machined metal outer cylindrical housing 12. The outer housing 12 terminates in end flanges 14 having appropriate radially disposed apertures 15 for joining the flanged ends of the fluid turbine meter to corresponding pipe flanges in the gas line. The housing 12 has a bore 83 therethrough for defining an inlet 85 and an outlet 87. Located in the top of the outer housing 12 is a circular raised portion forming a housing support 13 that encircles an inlet opening communicating with bore 83. An inner housing support plate 16 rests on the upper surface of support flange 13 and is sealed thereto by means of O-ring 20 and fastened by conventional means such as bolts 18.

Support plate 16 has a threaded recess 21 communicating with a bore 23 for alignment with bore 33 in the outer housing 12 to provide a pressure tap upstream of the rotor assembly. A conventional pipe fitting 11 is disposed in recess 21 for attaching a pipe or tubing for communication with a static pressure meter (not shown). O-ring 57 seals the aligned bores 23 and 33. In addition, a hole 63 is tapped in the wall of housing 12 for a pipe plug 61 or a pressure valve (not shown). The tap provides a means of relieving the interior of meter 10 prior to removing support plate 16 for maintenance.

Depending centrally from the inner housing support plate are two spaced-apart ears 17 having a transverse circular aperture drilled centrally through each ear for forming a yoke hanger. The inner housing 26 has a support tab 19 also having a transverse circular aperture therethrough. Tab 19 fits between the spaced-apart ears 17 of the yoke hanger and is rotatably fixed thereto by means of a support pin 27 passing through ears 17 and support tab 19. The tab has a small amount of lateral play between the depending ears 17 of the yoke hanger.

The inner housing 26 consists of an outer cylinder 31 having concentrically positioned therein spindle housing 29 integrally supported by means of radial supporting arms 28. A cover plate 44 is fitted over the downstream end of the conically tapering surface of the spindle housing 29. Tubing 25 projects upwardly from coverplate 44, through the outer cylinder 31 and upwardly through an aperture in the inner housing support plate and terminates in a conventional tube fitting 24 for use within an explosion-proof electrical housing (not shown). The tube fitting 24 is coupled to an explosion-proof connector 22, conventionally sealed and mounted on the upper surface of inner housing support plate 16.

The inner housing 26, suspended and supported by means of the yoke hanger (ears 17 and tab 19) from inner housing support plate 16, can pivot about support pin 27 insuring accurate concentric alignment of the inner housing 26 with the axial bore through meter housing 12. The inner housing 26 drops down into a machined opening in the interior of the outer housing 12 with the outer cylinder 31 guided and registered in place by support guides 32 disposed in the lower semicircular portion of the interior surface of housing 12. Since inner housing 26 can rotate about pin 27 in an axial direction, and outer cylinder 31 can rotate transversely within the opening in pipe housing 12 in contact with support guides 32, correct axial alignment of inner housing 26 with the inner bore of meter housing 12 is insured even if the top surface of housing plate support flange 13 is machined slightly out of tolerance. The seating of cylinder 31 upon the semicircular support guides 32 and the axial pivot action and lateral movement of tab 19 within yoke hanger 17 provide for axial self-alignment of inner housing 26.

The juncture of the upstream edge of outer cylinder 31 and the corresponding edge within pipe housing 12 is sealed by means of an O-ring recessed in the upstream edge of outer cylinder 31, for preventing fluid passing through the meter from leaking into opening 46 and out between the downstream juncture of the cylinder 31 and its corresponding portion of pipe housing 12, thereby bypassing the inner housing and escaping measurement. Similarly, the O-ring seal 30 prevents leakage through openings 47 which communicate with opening 46.

Rotor 40 having helical rotor blades 42 extending therefrom is shown rotationally mounted to spindle housing 29 in a manner to be hereinafter described in greater detail. The tips of blades 42 rotate beneath a circumferential recess or slot 48 in the interior surface of outer cylinder 31. The function of recess 48 in cooperation with blades 42 will be hereinafter explained in greater detail.

A gas flow deflector 34 having a hollow deflector tube 38 is concentrically positioned within housing 12 by means of deflector support ring 36 and integral radial supporting arms 37. Supporting ring 36 slipfits into a recess in the upstream end of meter housing 12 and is retained in its proper aligned position by means of retaining screw 35. The open end of deflector tube 38 is closely spaced to the upstream side of rotor 40. The outer diameter of tube 38, rotor 40 and the upstream portion of spindle housing 29 are of the same diameter for aiding fluid flow through the meter, and minimizing frictional and thrust forces.

Housing 12 is constructed of a material suitable for high or low gas pressure applications. Gas flow deflector 34, the inner housing support plate 16 and the inner housing 26 may also be constructed of a non-magnetic material such as aluminum or an aluminum alloy. Cover plate 44 and tube 25 may be made of any suitable material such as stainless steel.

Referring now to FIGS. 3, 5, 6 and 7, details of the mounting of rotor 40 and the interior of spindle housing 29 are shown. Spindle housing 29 has a cylindrical recess 39 in its upstream end terminating in an upstream face communicating with an axial bore through said spindle housing 29. One end of cylindrical spindle assembly 50 fits axially into the concentric bore through spindle housing 29 and is retained in its proper orientation by means of retaining pin 51 fitted into spindle housing 29 and aligned in slot 55 in the flanged spindle head 53 (See FIGS. 3 and 7). The outer surface of the flanged spindle head 53 conically tapers down to a vertical surface or shoulder 41 and then extends axially as a cantilevered cylindrical portion 54, bearing support portion 56 and ending in a threaded portion 76. Spindle portion 54 has disposed thereon a series of circumferential ribs 52, slanting downstream toward the vertical spindle head surface 41, and closely spaced adjacent thereto, for purposes that will be hereinafter more particularly described.

Figure 3:
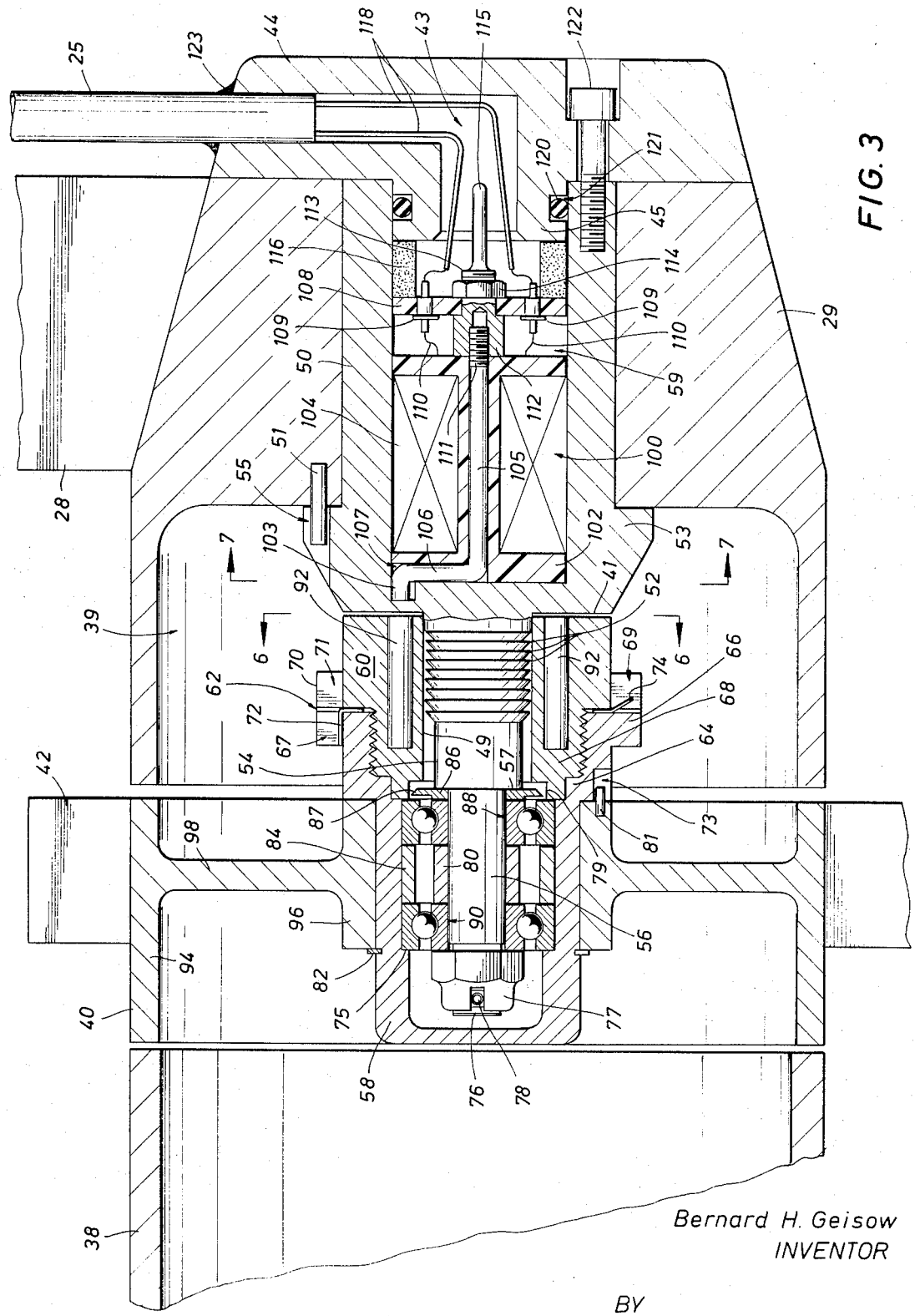
FIG. 3 is a detailed longitudinal cross-sectional view of the spindle housing, the rotor and its rotational mounting, the induction coil and the weir type seals of the turbine meter shown in FIG. 1.

A cylindrical magnet retainer member 60 has equidistantly radially disposed therein a preselected number of cylindrical magnets 92 equidistantly arcuately spaced one from the other. Magnet retainer member 60 has a threaded end 68 that mates with the interior threaded shoulder 64 of rotor hub 58. Rotor hub 58 and magnet retainer 60 are locked together as a single unit to form a rotor hub assembly by means of lock washer 62. Lock washer 62 is a conventional lock washer having a forwardly bent tab 72 that fits into a slot 67 in the rotor hub flange 66. Magnet retainer member 60 has a flange 70 that also has a pair of slots 71 and 69, spaced approximately 180° apart. Once the tab 72 of lock washer 62 has been inserted into slot 67 of the rotor hub flange 66, and the magnet retainer member 60 has been properly screwed into hub 58 for retaining the ball bearing assemblies 88 and 90, as will hereinafter be further described, the outer edge of lock washer 62 will be deformed to form a tab or "dimple"

in either slot 69 or slot 71 of flange 70, thus effectively locking the magnet retainer member 60 and the rotor hub 58 together as one unit. Into which slot the edge of washer 62 will be deformed depends on which slot, 69 or 71, is spaced further from slot 67 of rotor hub flange 66. As shown in FIGS. 3 and 6, the deformed tab or "dimple" 74 was formed in slot 69.

The inner surface 49 of magnet retainer 66 slides over the extending tips of circumferential ribs 52. The diameter of the bore forming the inner surface 49 of magnet retainer 60 is machined so that there is only a 0.0025—0.0030 inch clearance between the inner surface 49 and the outer tips of ribs 52 integrally formed in spindle portion 54. The circumferential ribs 52 with their outer edges in extremely close proximity to the inner surface 49 of magnet retainer 60 form a series of baffles or a weir type seal that traps dirt, gas rouge and other particles present in a fluid flowing through the meter 10. The extending ribs 52 trap dirt, gas rouge and other particles until the space behind the rib fills, then particles, if they are small enough, "spill over" the next adjacent rib until the space behind that rib is full, and the process is repeated. In this way the extending ribs act as adjacent and successive weirs to dam and trap particles of dirt, gas rouge and the like.

Rotor hub 58 is mounted for rotation on rotor shaft 56 by means of spaced first and second ball bearing assemblies 88 and 90, respectively. A bearing oil shield 86 is disposed between the first ball bearing assembly 88 and the upstream shoulder 57 of spindle section 54 and contacts the lower race of the first ball bearing assembly. The bearing oil shield 86 prevents some of the oil from escaping from the bearings, and has an extending cylindrical flange 87 terminating in a knife-pointed edge that fits within 0.0025—0.0030 inches of cylindrical recess 79 in the upstream end of magnet retainer 60 for acting as an additional baffle or weir type seal to protect bearing assemblies 88 and 90 from dirt, gas rouge or other particles.

Bearing assemblies 88 and 90 are maintained in a spaced relationship on rotor shaft 56 by means of an inner and outer bearing spacer 80 and 84, respectively. Nut 77 is attached to the threaded portion 76 and engages the upstream end of the inner race of the second ball bearing assembly 90, thereby holding inner bearing spacer 80 and the inner race of the first ball bearing assembly 88, against the bearing oil shield 86. The outer races of the ball bearing assemblies 88 and 90 and outer bearing spacer 84 are maintained in place between interior shoulder 75 of rotor hub 58 and the extreme upstream end surface of magnet retainer 60. When the ball bearing races are clamped between hub 58 and magnet retainer 60, flange 70 will be properly positioned to engage lock washer 62 as hereinbefore described. The action above described in locking the bearing assemblies 88 and 90, bearing spacers 80 and 84, rotor hub 58 and magnet retainer 60 together as one unit functions to make bearing assemblies 88 and 90 absorb any downstream thrust against rotor 40 and eliminates the need for a separate thrust bearing to absorb axial thrust.

A conventional nut retainer 78, such as a cotter pin or the like, is utilized to prevent nut 77 from loosening on threaded shaft 76. Rotor 40 is comprised of a rotor outer rim 94, a rotor inner rim 96 integrally connected by means of a supporting web 98. The rotor inner rim 96 is press fitted over the outer surface of rotor hub 58 and retained in place by means of a retaining ring 82 recessed into the outer surface of rotor hub 58. To prevent rotational slippage, a pin 81 is inserted into hub 96 through a slot 73 disposed in rotor hub 58. Blades 42 are integrally formed as a part of outer rim 94.

Spindle assembly 50, fixed to spindle housing 29, remain stationary and provides the rotor shaft 56 about which the rotor 40, rotor hub 58 and magnet retainer 60 move as one unit. It should be noted that the assembly of rotor 40, hub 58 and magnet retainer 60 is the only moving part of the turbine meter 10 disclosed. Since the counting of revolutions of rotor 40 to determine fluid volume passing through the rotor is accomplished by means of magnetic induction coupling utilizing the radially disposed magnets 92, as will hereinafter be more fully described, there is no necessity for using gears with their subsequent wear and inaccuracy.

Since the single largest cause of failure of fluid turbine meters, particularly gas turbine meters, is failure of the bearings, fluid entering the cylindrical opening 39 of spindle housing 29 will enter the narrow space between the upstream surface of magnet retainer 60 and the downstream vertical surface 41 of the flanged spindle head 53 to enter the interior of magnet retainer 60 and hub rotor 58. However, as earlier described, the series of spaced circumferential weir type sealing ribs 52 are so closely spaced to the interior cylindrical surface 49 of magnet retainer 60 that substantially all gas rouge, dirt and other solid particles in gas would be trapped within the space between succeeding weir trapping ribs thus preventing substantially all except the very finest grains of foreign matter to gain entry past the weir type seal and into the interior bore of magnet retainer 60, as previously described. In addition, frictional drag by trapping of dirt particles in the seal will never become significant because the only bearing surfaces are between the knife edge of each rib and the interior surface 49 of magnet retainer 60. A labyrinth seal, however, would allow the dirt particles to pack between the bearing surfaces of the seal and cause a high drag effect on the rotor 40 at low speed.

However, once particles enter the interior bore of magnet retainer 60, the additional seal provided by the knife-edged tip of the flange portion 87 of bearing oil shield 86 acts as yet another barrier to the entry of dirt or grit into the interior of hub assembly 58 and into the bearing assemblies 88 and 90. It has been found through experiments, that the weir type seal may provide protection of the rotor bearings for as long as twice the present life expectancy of conventional sealing arrangements utilized in present gas turbine meters. The primary times when fluid flow, particularly in gas meters, would cause infiltration of dirt, gas rouge and other foreign particles and grit into the seal area would be upon initial startup of the turbine meter and if wide pressure variations occur in the gas or fluid moving through the meter. However, once the meter is in operation, the recesses and openings within rotor hub 58 and magnet retainer 60 would be pressurized with the gas and no additional flow of gas through the weir type seals 52 would ordinarily occur.

Within spindle assembly 50 is a concentric cylindrical bore 59 extending into the flanged spindle head 53 and terminating in a recess 107 located at the extreme radial extremity of cylindrical bore 59. An induction coil assembly 100, comprising a coil bobbin 102 into which is inserted a Z-shaped induction pickup core 106, having a shorter end 103 that fits snugly into the above mentioned recess 107. The other end of the Z-shaped core 106 is a long shank 105 that passes axially through coil bobbin 102 with a threaded end 111 extending outwardly from the end of bobbin 102. A connector 112 is threadably attached to the threaded end 111 to hold the core snugly in place within the bobbin.

A terminal plate 108, having an axial bore through which the threaded end 113 of connector 112 extends is retained by means of a conventional retaining nut 114. Connector 112 then terminates in an integral extending handle 115 that extends outwardly from the threaded end 113 of connector 112 and has no function other than aid in insertion and removal of the induction coil assembly 100 into recess 59 during assembly and maintenance or repair.

Terminal plate 108 also has disposed therein two radially spaced terminal connectors 109 that extend through the plate and provide a means of attaching the loose ends 110 of induction coil 104 to one side of the terminals 109, while a pair of insulated conductors 118 are attached to the other side of terminals 109. Any conventional terminals and means of attaching the conductors may be utilized. A terminal plate supporting ring 116, preferably of a soft flexible material, such as sponge rubber or a sponge-like plastic material, or a suitable compression spring, is inserted to support terminal plate 108.

The bore 59 within spindle assembly 50 is closed by means of cover plate 44, which has a cylindrical extending portion 45 that slides into cylindrical bore 59 and seals the bore from the entry of fluid by means of an O-ring 120 exposed in a circumferential slotted recess 121. Cover plate 44 is conventionally attached to spindle assembly 50 by means of fasteners such as bolts 122. Cover plate 44 has an internal L-shaped bore into which the extension 115 of connector 112 extends and through which the insulated conductors 118 are brought for connection to terminals 109. A tube 25 is inserted into the upper end of the L-shaped bore 43 and fixed to cover plate 44 by means of welding or soldering 123. As may be seen in FIGS. 1 and 3, tubing 25 projects upwardly immediately behind the upper vertical radial support arm 28 through support plate 16 and terminates in tube fitting 24 for acting as a conduit for conductors 118. The location of tube 25 immediately behind and in line with radial support 28 minimizes air turbulence within the turbine meter as gas flows around supporting arms 28 and tubing 25.

The downstream end of the hollow deflection tube 38 is shown in position adjacent to the upstream side of rotor 40 and is aligned with the outer surface of rotor outer rim 94 and the exterior surface of spindle housing 29. As earlier described, the deflection tube 38 and spindle housing 29, including radial supporting arms 28 are preferably constructed of a lightweight nonferrous material, such as an aluminum alloy. Rotor hub 58, rotor 40 (including blades 42) may also preferably be constructed of any strong lightweight material, such as aluminum or possibly even stainless steel. However, it has been found that Delrin plastic material is ideally suited for construction of the rotor 40, since it is an extremely hard, durable material that may be machined as metal to very close tolerances and is an extremely wear-resistant material. Magnet retainer 60 may also be constructed of any nonferrous material, such as an aluminum alloy.

Referring now to FIGS. 1 and 3, fluid entering the turbine meter 10 is spread by flow deflector 34 which acts to compress the gas in plenum area 33 surrounding deflector tube 38 and forms the fluid into a square-wave velocity front for achieving a uniform velocity profile at the blades 42. Use of the spreader 34 virtually eliminates all end thrust on rotor 40 except for frictional thrust or drag due to the blades 42.

As the flowing gas moves through plenum area 33 and strikes the helical blades 42, rotor 40 and rotor hub 58, with the attached magnet retainer member 60, begin to rotate about the spindle rotor shaft 56. As the magnet retainer 60 rotates, each of the radially mounted magnets 92 passes the tip 103 of the induction pickup core 106, momentarily inducing a magnetic flux in core 106 and generating an electrical signal in coil 104 which is transmitted via the wires 110, terminals 109 and conductors 118 to appropriate recording and readout equipment, (not shown). As each successive magnet 92 passes tip 103 of core 106, a magnetic flux will be induced in core 104 thereby creating a series of electrical pulses transmitted via conductors 118 that vary in frequency according to the rotational speed of the rotor and hence the speed at which the magnets are rotated. The series of pulses produced, depending on the number of radially disposed magnets in magnet retainer 60 indicates the number of rotations of rotor 40 and hence indicates the measured volume of gas that has moved through the meter.

As a gas measuring meter, the utilization of one moving element, i.e., rotor 40, rotor hub 58 and magnet retainer 60 as a unit, coupled with a magnetic induction pickup system to determine the number of rotor revolutions and hence the volume of gas passing through the meter, eliminates any need for gears or gear driven shafts for registering mechanical registers and the like. Utilizing electronic digital measuring systems for recording and readout (not shown) eliminates the need for gears and gear shafts which are prone to wear and subsequently, inaccuracy. Further, elimination of gear trains and gear driven shafts eliminate a substantial source of built-in friction which severely limits turbine meter operation at low flow rates.

In turbine meter 10 herein described, the only forces opposing the rotation of rotor 40 is the inherent friction in ball bearing assemblies 88 and 90, the frictional drag on the rotor blades by the gas or fluid, and the torque created by the magnetic attraction between magnets 92 and core 106 acting through the small radius that the magnets are displaced from their axis of rotation. This is an important feature and advantage achieved by the disclosed invention, namely, the tremendously increased mechanical advantage achieved by the much greater torque created by the fluid force acting on rotor blades 42 at the relatively long radius that the blades are displaced from the axis of rotation, when compared to the very small torque due to magnetic attraction between magnets 92 and core 106 above described. In addition, the viscous drag effect caused by fluid compressed between the tips of the blades 42 and the interior of housing 12 is relieved by means of circumferential slot 48.

This mechanical advantage is substantially greater than if the induction coil was mounted in the meter housing directly over the blades, as is commonly utilized in many fluid meter designs, since the torque opposing rotor rotation created by the magnetic attraction between blades and induction coil is working through a much longer radius, i.e., from blades to axis of rotation. Elimination of a substantial portion of the opposing torque created by the magnet coupling has increased dramatically the "low end" or low pressure, low flow rate performance of the turbine meter herein disclosed.

In addition, since the number of magnets disposed in retainer 60 can be varied, the meter constant can be varied to suit a particular user's requirement. If additional pulses per rotor rotation are desired, a retainer having additional magnets can be utilized. If fewer pulses per rotor rotation are desired, fewer magnets are utilized in the retainer. This would be extremely difficult to accomplish in present meters where a magnet and induction coil are disposed in the meter housing radially opposite the rotor blades. The number of blades would have to be changed to change the meter constant.

Numerous variations and modifications may obviously be made in the structure herein described without departing from the present invention. Accordingly, it should be clearly understood that the forms of the invention herein described and shown in the figures of the accompanying drawings are illustrative only and are not intended to limit the scope of the invention.

What is claimed is:

1. An improved gas turbine flow meter comprising:

a housing having axial inlet and outlet openings and a transverse opening in the top wall thereof communicating with the interior of said housing and a transverse recessed area therein, a support plate removably attachable to said housing to close said top transverse opening and having a depending yoke assembly projecting into said housing, an inner housing assembly having an axial bore therethrough adapted for removable attachment to said support plate yoke assembly and insertable through said transverse top opening into said housing, said inner housing assembly supported within said transverse housing recess by raised transverse supports within said recess for causing registration of the axes of said housing and said inner housing assembly, said yoke attachment of said inner housing assembly to said support plate providing limited longitudinally and transverse movement of said inner housing assembly with respect to said plate for allowing said plate to be sealingly engaged with top surface of said transverse housing opening, said inner housing assembly including a spindle assembly coaxially supported within said inner housing assembly and having a cantilevered cylindrical shaft projecting axially toward said housing inlet opening, a rotor mounted on said cantilevered shaft and adapted for rotation by action of the gas flow through said housing and inner housing assembly, said rotor including a cylindrical rotor hub assembly closed at one end and rotatably mounted by combined thrust and rotating bearing means to said cantilevered shaft and enveloping a circumferential ribbed portion of said shaft, the outer edges of said ribs being very closely circumferentially spaced from the interior of said rotor hub assembly for forming a weir type seal between said bearing means and the open end of said rotor hub assembly for preventing and trapping dirt particles, an induction pickup coil disposed within said spindle assembly and having a pickup core one end of which terminates in a position radially offset from the axis of rotation of said rotor, a plurality of magnets disposed in said rotor hub assembly, said magnets being equidistantly arcuately spaced one from the other and radially spaced from the rotor axis equidistant to the radial offset of said one end of said pickup core, each of said magnets inducing a magnetic flux in said pickup core as said rotor rotates for inducing a series of electrical pulses in said pickup coil, and means for transmitting said induced series of electrical pulses from said pickup coil within said spindle assembly to a point external to said housing.

2. The fluid flow meter as described in claim 1, wherein said spindle assembly comprises:

a generally cylindrical spindle housing supported by radial arms axially within said inner housing assembly, said spindle housing having an axial bore therethrough and an axial cylindrical recess communicating with the upstream face thereof, a cylindrical shaft one end of which is mounted in said axial bore in said spindle housing and the other end of which projects coaxially through said cylindrical recess toward said housing inlet for forming said cantilevered shaft, said one end of said shaft having a cylindrical bore for accepting said induction pickup coil, and a cover plate sealingly attached to the downstream end of said spindle housing for closing said bores within said spindle housing and said one end of said shaft disposed in said spindle housing.

3. The gas flow meter described in claim 1, wherein said depending yoke assembly of said support plate comprises a pair of spaced-apart depending yoke ears accommodating a transverse support pin and is attached to said inner housing assembly by means of an upright tab having an aperture therethrough adapted for insertion between said depending yoke ears and attachment by means of said support pin.

4. The fluid-flow meter as described in claim 1, wherein said means for transmitting said induced series of electrical pulses from said pickup coil to a point external of said housing comprises:

a tube fixed to said cover plate and communicating with the interior of said recess in said one end of said shaft disposed in said spindle housing and extending radially through said housing, and a pair of conductors connected to said pickup coil and passing through said tube to a point external of said housing.

5. The gas flow meter as described in claim 1, including a deflection tube closed at one end and supported coaxially within said housing, the closed end of said tube facing said housing inlet and the open end of said tube closely spaced to the upstream face of said rotor for shaping fluid flow through the housing prior to engaging the rotor and substantially eliminating end thrust on said rotor.

6. The gas flow meter as described in claim 1, wherein
   said rotor hub assembly comprises,
   a cylindrical hub member closed at one end and having an exterior circumferential extending flange about the other end, said other end having internal screw threads,
   a cylindrical magnet retainer member one end of which is threaded for mating with the internal threaded end of said hub member and having an extending circumferential flange adjacent said threaded one end, said magnet retainer having a plurality of bores in its downstream face for mounting said plurality of magnets, the interior surface of said cylindrical magnet retainer encasing said ribbed portion of said cantilevered shaft, and
   a lock washer disposed between said extending circumferential flanges of said hub and magnet retainer members, a first tab of said lock washer engageable in a slot in said hub member flange and a second tab of said lock washer engageable in a slot in said magnet retainer member flange for locking the hub and magnet retainers together as one unit.

7. The gas flow meter as described in claim 6, wherein said cylindrical shaft further includes,
   a first portion adjacent said projecting end for mounting said bearing means,
   a second portion spaced from said first portion and said other end, said second portion having said circumferential ribs and spaced adjacent the upstream inner face of said spindle housing,
   a third portion connecting said first portion and said second portion, said third portion having a diameter greater than said first portion and forming a shoulder at the junction therewith, and
   a threaded portion connecting said first portion and said projecting end.

8. The gas flow meter as described in claim 7, wherein said cylindrical hub member has an internal shoulder spaced adjacent said closed end, the inner diameter of said hub member being smaller in the space between said closed end and said shoulder.

9. The gas flow meter as described in claim 8, wherein said bearing means comprises, a disc shaped bearing oil shield having an axial bore therethrough and mounted on said first shaft portion in contact with said shoulder, said bearing shield having a knife-edged circumferential edge,
   a first bearing assembly having inner and outer races mounted on said first shaft portion in contact with said bearing oil shield,
   an inner cylindrical spacer mounted on said shaft first portion with one edge in contact with said inner race of said first bearing assembly,
   an outer cylindrical spacer supported with one edge in contact with said outer race of said first bearing assembly by the inner surface of said hub member,
   a second bearing assembly having inner and outer races mounted on said first shaft portion, one edge of said inner race being in contact with the other edge of said inner spacer and one edge of said outer race being in contact with the other edge of said outer spacer, and
   a nut threaded on said shaft end into contact with the other edge of said inner race of said second bearing assembly to apply a squeezing pressure between said inner races and said inner spacer against said bearing oil shield and shaft shoulder for holding said inner bearing races firmly in a spaced apart relation,
   The other edge of said outer race of said second bearing assembly contacting said hub member inner shoulder for firmly clamping said outer races and said spacer against the edge of said one threaded end of said magnet retainer threadably mated with said hub member for holding said outer bearing races in a spaced apart relation,
   said knife-edged circumferential edge of said bearing oil shield being very closely spaced from the inner surface of said magnet retainer for lessening oil leakage from said bearing assemblies and to provide an additional seal.

* * * * *